May 13, 1969
D. C. REILLY
3,443,678
VARIABLE TROUGH SUPPORT
Filed Dec. 27, 1966
Sheet 1 of 2
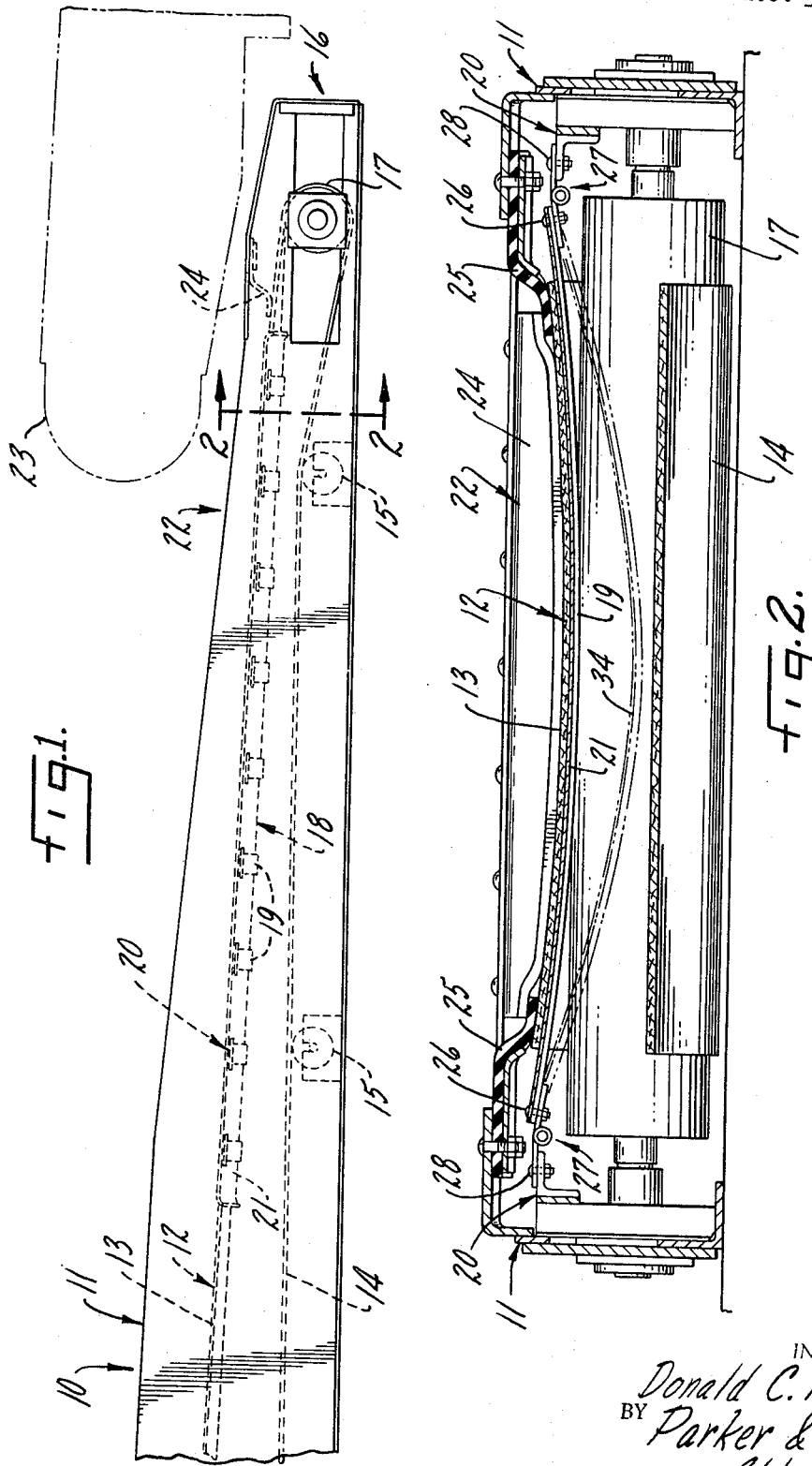
INVENTOR.
Donald C. Reilly,
BY Parker & Carter
Attorneys.

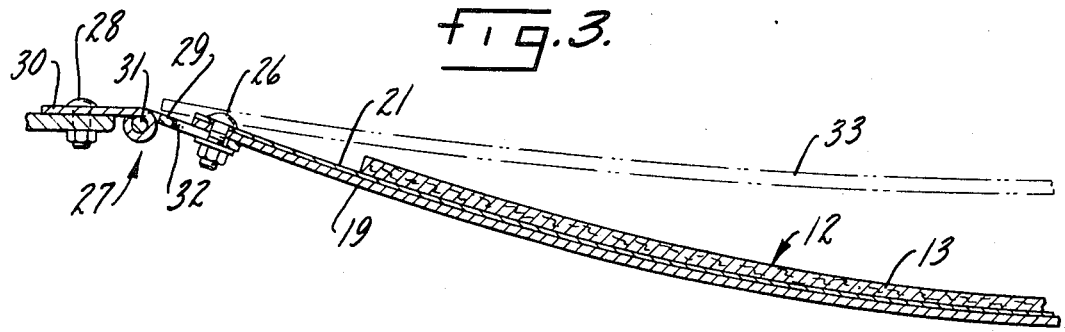
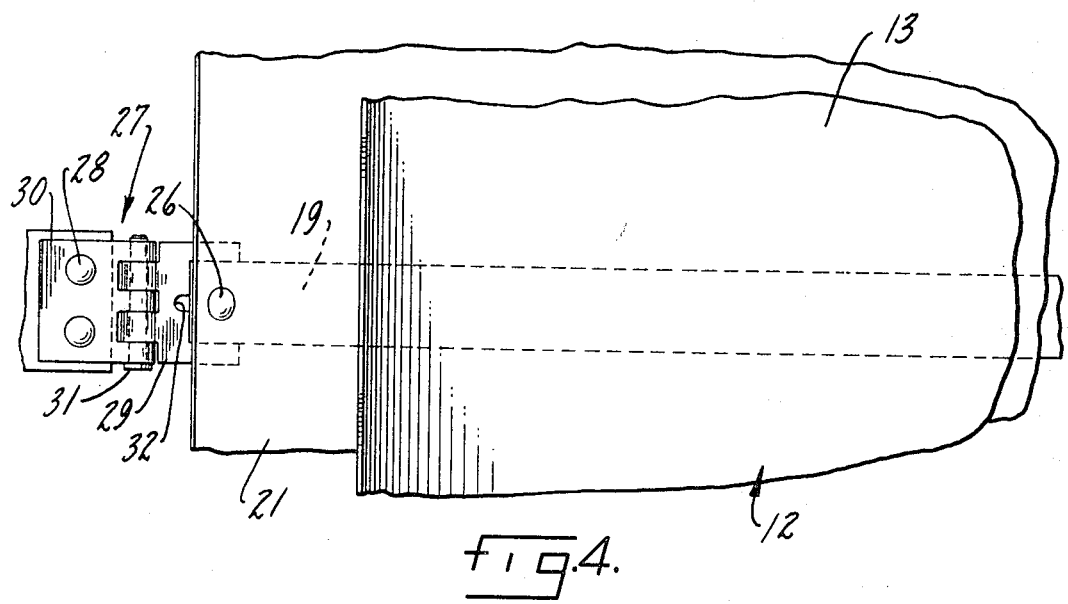
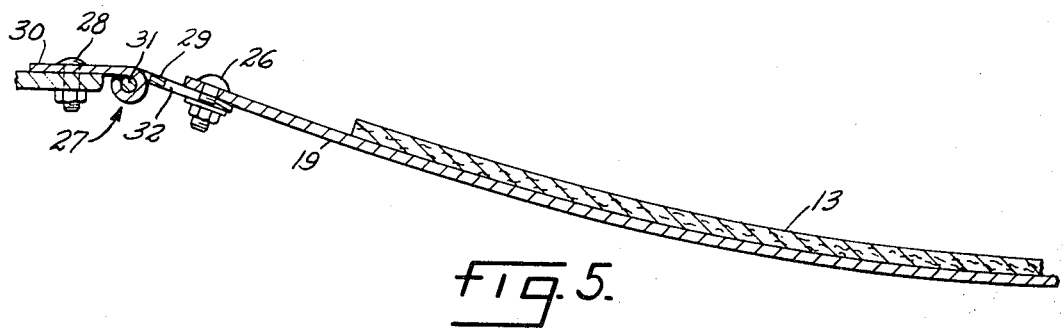

United States Patent Office 3,443,678
Patented May 13, 1969

3,443,678
VARIABLE TROUGH SUPPORT
Donald C. Reilly, Downers Grove, Ill., assignor to Westinghouse Air Brake Company, Pittsburgh, Pa., a corporation of Pennsylvania
Filed Dec. 27, 1966, Ser. No. 604,712
Int. Cl. B65g *15/08*
U.S. Cl. 198—191          5 Claims

ABSTRACT OF THE DISCLOSURE

A low clearance conveyor belt supporting apparatus having a number of parallel leaf springs respectively, pivotally and slidably attached at each end to side frame supporting structures to enable flexing of the springs upon application of a force to the overlying conveyor belt.

---

This invention relates to belt conveyors for conveying loose material such as coal, ore, sand, and the like, and more particularly to an impact absorbing structure of minimal vertical height for supporting at least the material receiving portion of the conveying reach of a conveyor belt.

Endless conveyors have come into widespread use for conveying loose material from one location to another. In many such applications, the material to be conveyed is delivered to the belt conveyor receiving end by an overhanging conveyor apparatus which drops such material onto the belt conveyor from various heights. For example, in mining coal, the discharge boom of a continuous miner may overhang the material receiving end of the belt conveyor, dropping the mined coal from various heights to the conveyor belt. The conveyor belt and supporting structure of a belt conveyor utilized in such an application is consequently subjected to repeated and often severe impact loading. Where the belt conveyor is to be used in a low clearance environment, such as a low coal mine or the like, the receiving end of the conveyor must be of a minimum vertical height in order to allow positioning under the material delivering apparatus.

It is, therefore, a primary object of this invention to provide a yieldable low clearance structure for supporting at least the material receiving portion of a conveyor belt.

Another object is to provide a low clearance impact absorbing structure for supporting the conveying reach of a conveyor belt which forms such belt into a trough, the depth of which will automatically increase as the volume of material to be conveyed increases.

Another object is to provide a low clearance impact absorbing and troughing supporting structure for the conveying reach of a conveyor belt which may be simply and economically constructed.

Yet another object is to provide a low clearance conveyor belt supporting structure comprising a plurality of spaced parallel leaf springs oriented transversely to the conveyor belt longitudinal axis, with such leaf springs hingably and slidably attached at each end to the belt conveyor side frame structure, thereby enabling such supporting leaf springs to be arcuately flexed upon application of an impact load to the conveyor belt so as to absorb the impact energy and mitigate the shock loading experienced by the supporting side frames.

A further object is to provide a continuous impact absorbing structure for supporting a conveyor belt conveying reach or a portion thereof.

Other objects and advantages of the invention will become apparent upon reading the following description of the invention.

The invention is illustrated more or less diagrammatically in the accompanying drawings wherein:

FIGURE 1 is a partial side elevational view of an endless type belt conveyor in which the impact absorbing, conveyor belt supporting structure of this invention has been incorporated;

FIGURE 2 is a view taken along line 2—2 of FIGURE 1;

FIGURE 3 is a partial sectional view, to an enlarged scale, of the impact absorbing and conveyor belt supporting structure of this invention;

FIGURE 4 is a partial top plan view of the impact absorbing and conveyor belt supporting structure of FIGURE 3; and FIGURE 5 is a partial, sectional view of another embodiment of the invention.

Like reference numerals will be used to refer to like parts throughout the following description of the drawings.

Referring now to FIGURE 1, a continuous type belt conveyor is shown generally at 10 having the impact absorbing, belt supporting structure of this invention incorporated therein. The belt conveyor 10 comprises spaced side frame structures 11 generally paralleling a conveyor course which is defined by a conveyor belt 12 having a conveying reach 13 and a return reach 14. The return reach 14 of the conveyor belt 12 is supported at intervals by idler pulley assemblies 15, which are in turn mounted and supported at each end by the side frame structures 11.

The belt conveyor 10 has a material discharge end, not shown, and a material receiving end 16. At the material receiving end 16, an idler pulley 17 is provided about which the endless conveyor belt 12 turns in reversing its direction from the return reach 14 to the conveying reach 13. The conveying reach 13 is shown as being supported at the material receiving end 16 by the impact absorbing and conveyor belt supporting structure of this invention generally at 18. The impact absorbing structure 18 comprises generally parallel spaced leaf springs 19 hingably and slidably attached, as at 20, at each end to the side frame structures 11 and a continuous spring plate 21 extending along the longitudinal axis of the conveying reach 13 overlying, attached to and supported at spaced intervals by the leaf springs 19. The conveyor belt 12, in turn, overlies and is supported by the spring plate 21. Although the impact absorbing structure 18 has been depicted as extending under and supporting only that portion of the conveying reach 13 which is expected to receive impacting material, with the remaining portion of the conveying reach supported at intervals by, for example, conventional troughing roller assemblies, not shown, it should be understood that the impact absorbing structure 18 may be employed over the entire conveying reach or any portion thereof.

The receiving end 16 of the belt conveyor 10 may be formed with a material receiving trough or hopper as is generally indicated at 22. A device, such as the discharge boom of a continuous miner or a conveyor or the like, which may be utilized to discharge or dispense the material to be conveyed into the belt conveyor trough or hopper 22 and, in turn, to the conveying reach 13 of the endless conveyor belt 12 is shown generally in phantom at 23 in FIGURE 1. In general, the invention will be most advantageously applicable to environments having very limited vertical clearance, such as low seam coal mines.

Referring now to FIGURE 2, the endless coneyor belt 12 is shown reversing its direction from the return reach 14 to the conveying reach 13 by rotating around idler pulley 17. The idler pulley 17 is rotatably mounted and retained by the side frame structures 11.

The material receiving trough or hopper 22 is shown as being formed by a generally dish shaped end portion 24 which is flared downwardly toward the conveying and by spaced resilient aprons 25 generally paralleling each side of the conveyor belt 12. The conveyor belt 12 is supported by an intermediate member or spring plate 21, which, in turn, is supported and attached to leaf springs 19 by fasteners 26.

The leaf springs 19 are attached at each end by fasteners 26 to hinges, indicated generally at 27. The hinges are attached to the side frame supporting structures 11 by fasteners 28.

An enlarged view of the impact absorbing and conveyor belt supporting structure of this invention is shown in FIGURES 3 and 4, wherein the conveying reach of the conveying belt 12 is shown as being supported by the continuous spring plate 21. The spring plate 21 overlies, is attached to and supported by the leaf springs 19 by fasteners 26, which also attach the leaf springs 19 and spring plate 21 to movable part 29 of the hinges 27. Each hinge 27 comprises a movable part 29 hingably attached to a fixed part 30 by a hinge pin 31.

In attaching the spring plate 21 and leaf springs 19 to the movable hinge part 29, the fastener 26 engages a slot 32. The slot 32 is formed with a slot axis generally colinear with the longitudinal axis of the leaf spring 19 so that as said leaf spring flexes from its unloaded position, shown generally in phantom at 33 in FIGURE 3, the fastener 26 will slide downwardly within such slot.

The fixed hinge parts 30 are rigidly attached to the side frame supporting structures 11 by suitable fasteners 28 thereby hingably and slidably mounting the leaf springs 19 and spring plate 21 to such side frame structures.

Although the conveyor belt 12 has been depicted and described as being supported by the leaf springs 19 through the continuous overlying spring plate 21, it should be understood that spring plate 21 need not be used and that the conveyor belt may be supported directly by and rest directly on leaf springs 19 as shown in FIGURE 5. Further, although the movable hinge parts 29 have been shown and described as being slotted, it should be understood that leaf springs 19 and spring plate 21 may be slotted instead, or other attachment means may be used.

The use and operation of the invention are as follows:

This invention provides a structure having a minimum vertical height for use in belt conveyors for both supporting the conveyor belt through any desired portion of the conveying reach and for absorbing impact loads resulting from the method of delivery of the material to be conveyed upon the conveyor belt.

The supporting structure of this invention may extend over the entire length of the conveying reach, or it may be employed only over the probable or expected material impact area or length of the conveying reach. Where the latter alternative is elected, the remaining portion of the conveying reach may be supported by any suitable structure such as a series of spaced troughing idler assemblies.

As the material to be conveyed is delivered or deposited onto the conveying reach of the conveyor belt 12, as for example by dropping such material from a discharge boom 23 of a continuous miner, the impacting force on the conveyor belt will cause the leaf springs 19 and spring plate 21 to be deflected in a downward arcuate path. For example, upon impact, the leaf springs 19 and spring plate 21 may be deflected to a position as indicated by the phantom lines 34 in FIGURE 2. In so deflecting, the spring plate and leaf spring ends slide inwardly and downwardly along slots 32, while the movable hinge part 29 rotates downwardly. By utilizing a leaf spring, a degree of vertical deflection can be obtained which compares favorably with the deflection obtainable from the rope suspended troughing roller assembly of the type disclosed in the Craggs et al. Patent 2,773,257 yet only a fraction of the vertical clearance is required. In essence, nearly all of the vertical space between the reaches 13 and 14 is used to accommodate deflection. As can be best seen in FIGURES 2 and 3, the leaf spring ends slide in a direction which has both a horizontal, in this instance lateral, and vertical component of movement.

A spring plate 21 may be provided which overlies the leaf springs 19, thereby relieving the conveyor belt 12 from excessive impact loading by providing continuous support over the entire impact area of the conveying reach. In addition, the spring plate more evenly distributes any impact loading between the successive leaf springs.

It should be noted that the leaf springs and spring plate in their free, unloaded condition, are slightly downwardly arced so as to form a trough. As the amount of material being carried by the conveying reach of the conveyor belt 12 increases, the depth of the trough formed by the leaf spring 19 and, therefore, the conveyor belt 12 will automatically increase.

To reduce friction between the conveyor belt 12 and the spring plate 21, a conveyor belt having for example, a rubber top with a low friction cotton twill bottom may be utilized. Alternatively, the spring plate 21 may have its upper surface coated with a low friction material. For example, the upper contact surface of the spring plate 21 may have a low friction plastic or teflon coating; or, the upper contact surface of the spring plate may be provided with a low friction cotton twill liner.

Although a preferred embodiment of the invention has been illustrated and described, such embodiment is intended to be exemplary only, and not definitive. Accordingly, the scope of the invention should be limited only by the scope of the following appended claims.

I claim:

1. A trough shaped conveyor belt supporting structure for use in a low clearance environment belt conveyor of the type having a pair of spaced, generally parallel side frame structures extending along a conveyor course, said belt supporting structure comprising: a plurality of spaced, generally parallel leaf springs extending transversely to said conveyor course; said leaf springs secured to said side frames by a plurality of hinges, each hinge being rigidly secured on one side to one of said side frame structures and on the other side slidably secured to one end of a leaf spring to thereby enable arcuate flexing of each said leaf spring upon application of a force thereto; and a continuous intermediate member overlying and attached to said leaf springs.

2. A yieldable troughing structure for supporting at least a portion of the conveying reach of an endless conveyor belt, said structure comprising a plurality of spaced, generally parallel leaf springs transversely disposed with respect to said conveyor belt, supporting structure on each side of said conveyor belt, said leaf springs pivotably and slidably attached to said supporting structure by a plurality of hinges, each said hinge being rigidly attached on one side to said supporting sructure and slidably attached on the other side to one end of a leaf spring, and a continuous intermediate member overlying and attached to said leaf springs to thereby provide a continuous supporting surface for said conveyor belt.

3. In a conveyor, in combination,
   a plurality of leaf spring members disposed substantially transversely to a conveying course,
   the upper surface of each leaf spring member having a stationary surface supporting a conveyor belt in sliding, supporting, contacting, relationship,
   the exterior outline of a section of said leaf spring member taken in a substantially vertical plane parallel to the conveying course having substantially parallel upper and lower sides.

a stationary support structure for each end of each leaf spring member, and means for connecting each end of a leaf spring member to a stationary support structure which enables each end of said leaf spring member to be displaced in a direction which has a lateral component of movement in response to load with respect to its associated stationary support structure, each leaf spring member being of substantial thickness to thereby provide, in conjunction with the stationary support structures and connecting means, support for a conveyor belt passing thereabove.

4. The conveyor of claim 3 further characterized in that, each leaf spring member has a low friction surface.

5. In a conveyor, in combination, a plurality of leaf spring members disposed substantially transversely to a conveying course in a first portion of said conveyor, said first portion of the conveyor being subjected to shock loadings, the upper surface of each leaf spring member having a stationary surface supporting, a conveyor belt, a member positioned intermediate the leaf spring member and the conveyor belt, said intermediate member providing continuous support for the conveyor belt which is adapted to be supported on and slidable thereover in contacting relationship, said intermediate member having sufficient thickness to distribute loading between successive leaf spring members, the exterior outline of a section of said leaf spring member taken in a substantially vertical plane parallel to the conveying course having substantially parallel upper and lower sides, a stationary support structure for each end of each leaf spring member, means for connecting each end of a leaf spring member to a stationary support structure which enables each end of said leaf spring member to be displaced in response to load with respect to its associated stationary support structure, each leaf spring member being of substantial thickness to thereby provide, in conjunction with the stationary support structures and connecting means, support for a conveyor belt passing thereabove, a plurality of belt support means disposed substantially transversely to a conveying course in a second portion of said conveyor, said belt support means also supporting said conveyor belt, a stationary support structure for each end of each belt support means, means for connecting each end of each belt support means to a stationary support structure which enables each end of said belt support means to be displaced in response to load with respect to its associated stationary support structure, each belt support means in said second portion of the conveyor providing, in conjunction with the stationary support structures and connecting means, support for a conveyor belt passing thereabove.

References Cited

UNITED STATES PATENTS 2,774,462  12/1956  Poundstone.

FOREIGN PATENTS 113,094  2/1943  Sweden.

RICHARD E. AEGERTER, *Primary Examiner.*